(12) United States Patent
Chen et al.

(10) Patent No.: US 10,126,019 B2
(45) Date of Patent: Nov. 13, 2018

(54) SEASONAL HEAT-COLD ENERGY STORAGE AND SUPPLY POOL AND SEASONAL HEAT-COLD ENERGY STORAGE AND SUPPLY SYSTEM COMPRISING THE SAME

(71) Applicant: ZHONGYING CHANGJIANG INTERNATIONAL NEW ENERGY INVESTMENT CO., LTD., Wuhan (CN)

(72) Inventors: Yilong Chen, Wuhan (CN); Shuchuan Hu, Wuhan (CN); Yanfeng Zhang, Wuhan (CN)

(73) Assignee: ZHONGYING CHANGJIANG INTERNATIONAL NEW ENERGY INVESTMENT CO., LTD., Wuhan (CN)

( * ) Notice: Subject to any disclaimer, the term of this patent is extended or adjusted under 35 U.S.C. 154(b) by 316 days.

(21) Appl. No.: 14/975,890

(22) Filed: Dec. 21, 2015

(65) Prior Publication Data
US 2016/0102887 A1    Apr. 14, 2016

Related U.S. Application Data

(63) Continuation-in-part of application No. PCT/CN2014/080109, filed on Jun. 17, 2014.

(30) Foreign Application Priority Data

Jun. 21, 2013 (CN) .......................... 2013 1 0248847

(51) Int. Cl.
  *F24J 2/00* (2014.01)
  *F24S 10/10* (2018.01)
  (Continued)

(52) U.S. Cl.
  CPC .......... *F24S 10/10* (2018.05); *F24D 11/0221* (2013.01); *F24S 10/17* (2018.05);
  (Continued)

(58) Field of Classification Search
  CPC .. F24J 2/34; F24J 2/0461; F24J 2/0007; F24J 2/0472; F24D 11/0221; F24D 2200/11;
  (Continued)

(56) References Cited

U.S. PATENT DOCUMENTS 4,380,993 A * 4/1983 Spitzer .................. F24J 2/0461
                                                    126/561

* cited by examiner

*Primary Examiner* — Alfred Basichas
(74) *Attorney, Agent, or Firm* — Matthias Scholl P.C.; Matthias Scholl

(57) ABSTRACT

A seasonal heat-cold energy storage and supply pool, including a salt-free solar pool at the upper layer and an energy storage pool at the lower layer. The salt-free solar pool and the energy storage pool are separately connected to a water source. The salt-free solar pool includes a pool bottom and a pool wall. The pool bottom of the salt-free solar pool functions as a top cover of the energy storage pool. The energy storage pool includes a wall and a bottom which are a composite layer. The energy storage pool is provided with a heat exchange coil configured to implement heat exchange in the energy storage pool for supplying heat and cold for an external user. The salt-free solar pool and the energy storage pool are communicated through controllable valves at the pool bottom of the salt-free solar pool.

18 Claims, 2 Drawing Sheets

(51) Int. Cl.
  *F24S 20/61* (2018.01)
  *F24D 11/02* (2006.01)
  *F24S 10/17* (2018.01)
  *F24S 60/00* (2018.01)

(52) U.S. Cl.
  CPC .............. *F24S 20/61* (2018.05); *F24S 60/00* (2018.05); *F24D 2200/11* (2013.01); *F24D 2200/12* (2013.01); *F24D 2200/14* (2013.01); *Y02B 10/20* (2013.01); *Y02B 10/40* (2013.01); *Y02B 10/70* (2013.01); *Y02B 30/125* (2018.05); *Y02E 10/44* (2013.01)

(58) Field of Classification Search
  CPC . F24D 2200/12; F24D 2200/14; Y02B 10/40; Y02B 10/20; Y02B 10/70; Y02B 30/126; Y02E 10/44
  See application file for complete search history.

SEASONAL HEAT-COLD ENERGY STORAGE AND SUPPLY POOL AND SEASONAL HEAT-COLD ENERGY STORAGE AND SUPPLY SYSTEM COMPRISING THE SAME

CROSS-REFERENCE TO RELATED APPLICATIONS

This application is a continuation-in-part of International Patent Application No. PCT/CN2014/080109 with an international filing date of Jun. 17, 2014, designating the U.S. ,now pending, and further claims priority benefits to Chinese Patent Application No. 201310248847.7 filed Jun. 21, 2013. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a seasonal energy storage and supply technology, and more particularly to a seasonal heat-cold energy storage and supply pool, as well as a seasonal heat-cold energy storage and supply system comprising the same.

Description of the Related Art

In areas with hot summer and cold winter, wide seasonal temperature variations lead to energy wasting. Collecting and utilizing the seasonal heat energy and cold energy has become a new research focus for reducing the power load and protecting the environment.

SUMMARY OF THE INVENTION

In view of the above-described problems, it is one objective of the invention to provide a seasonal heat-cold energy storage and supply pool. The pool is adapted to utilize water in the rivers and lakes to store seasonal energy for heat and cold supply in areas which are hot in summer and cold in winter, so as to save energy and protect environment.

To achieve the above objective, in accordance with one embodiment of the invention, there is provided a seasonal heat-cold energy storage and supply pool, comprising a salt-free solar pool at an upper layer and an energy storage pool. The salt-free solar pool and the energy storage pool are separately connected to a water source. The salt-free solar pool comprises a pool bottom and a pool wall. The pool bottom of the salt-free solar pool functions as a top cover of the energy storage pool. The energy storage pool comprises a wall and a bottom which are a composite layer. The energy storage pool is provided with a heat exchange coil to implement heat exchange in the energy storage pool for supplying heat and cold for an external user. The salt-free solar pool and the energy storage pool are communicated through controllable valves at the pool bottom of the salt-free solar pool.

In a class of this embodiment, the pool bottom and pool wall are made from steel frame comprising two layers of steel plates and a polyurethane insulation coating sandwiched by the two layers of steel plates.

In a class of this embodiment, the salt-free solar pool is provided with a transparent top cover.

In a class of this embodiment, the top cover is an inflated polyethylene bag.

In a class of this embodiment, a depth of the salt-free solar pool is between 300 mm and 500 mm, and a waterlogging depth is between 200 mm and 400 mm.

In a class of this embodiment, the composite layers of the energy storage layer comprise a waterproof layer, supporting layer, and insulation layer in sequence.

In a class of this embodiment, outer surfaces of the pool bottom and the pool wall of the salt-free solar pool are coated with a solar-energy absorbing coating made from silica sol, or cheaper solar-energy absorbing coating which has similar performance to the coating made from silica sol.

In a class of this embodiment, a flashboard is disposed on an edge of the pool bottom of the salt-free solar pool. A chute is disposed on an edge of the wall of the energy storage pool. The flashboard is adapted to slide and position in the chute, and then sealed by a sealing cap. The salt-free solar pool was supported by buoyant force of water in the energy storage pool.

It is another objective of the invention to provide a seasonal energy storage system comprising at least two seasonal heat-cold energy storage and supply pools and a heat pump. When at least one seasonal heat-cold energy storage and supply pool is used for cold storage and supply, at least one seasonal heat-cold energy storage and supply pool is used for storage and supply, and vice versa. One end of the heat pump is connected to a circulation line of the heat exchange coil of each energy storage pool, and another end is connected to the external user. A plurality of water pumps and valves are disposed in pipelines of the system to provide power and control working conditions of the system.

Advantages of the seasonal heat-cold energy storage and supply pool and the seasonal energy storage system comprising the same according to embodiments of the invention are summarized as follows.

1) The seasonal heat-cold energy storage and supply pool is used as a substitute for conventional solar panels, and water zones can be used to dispose the salt-free solar pool, so as to avoid high cost and large land occupation of conventional solar panels.

2) The seasonal heat-cold energy storage and supply pool has a higher solar collecting efficiency. The salt-free solar pool features a shallow pool structure, and shallow pool absorbs heat fast with a high solar collecting efficiency generally being more than 50%, so when normal water temperature on the lake surface in summer at areas which are hot in summer and cold in winter is between 30° C. and 35° C., the water temperature in the shallow pool at noon (having the strongest solar radiation) is heated to more than 50° C., thus the solar collecting capacity is effectively improved.

3) The seasonal heat-cold energy storage and supply pool features dual function of heat and cold collecting and storage. Lines and apparatus comprising the heat pump and the water pump in cooperation with the salt-free solar pool constitute the seasonal energy storage system for seasonally heating and cooling of the external user, thus energy is saved and environment is protected.

4) The seasonal heat-cold energy storage and supply pool features novel structure and low cost. The salt-free solar pool on the upper layer is supported by the buoyant force of water in the energy storage pool at the lower layer, thus no extra supporting structure is needed, thereby saving costs and construction. Energy storage pool could be constructed in a way of simple reservoir at areas having good hydrogeology conditions, costing less than a reinforced concrete structure.

5) The seasonal heat-cold energy storage and supply pool is environmental-friendly. Unlike common solar pool containing salt, the salt-free solar pool is pollution-free and non-corrosive.

Figure 1:
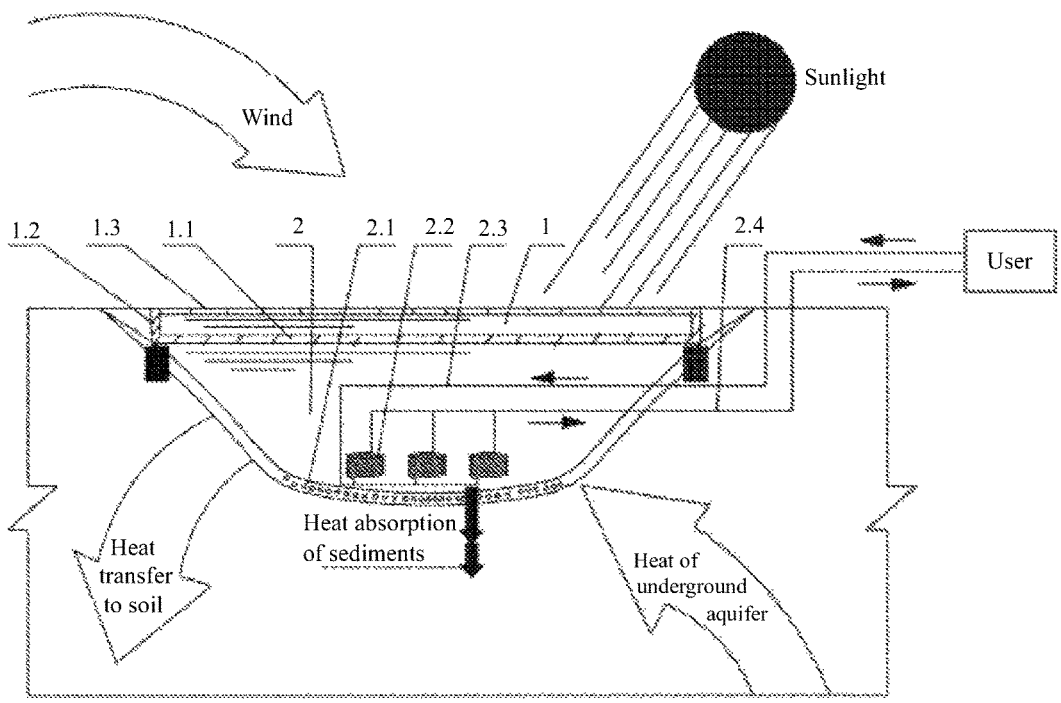
FIG. 1 is a schematic diagram of a seasonal heat-cold energy storage and supply pool in accordance with one embodiment of the invention.

In the drawings, the following reference numbers are used: 1. Salt-free solar pool (1.1 Pool bottom; 1.2 Pool wall; 1.3 Top cover; 1.4 Flashboard; 1-I Salt-free solar cold-collecting pool; 1-II Salt-free solar heat-collecting pool); 2. Energy storage pool (2.1 Composite layer; 2.2 Heat exchange coil; 2.3 Water return pipe; 2.4 Water supply pipe; 2.5 Chute; 2.6 Sealing cap; 2-I Cold storage pool; 2-II Heat storage pool); 3.1-3.5 Water pumps; 4.1-4.13 Valves; 5. Heat pump (5.1 Evaporator; 5.2 Condenser; 5.3 Reversing valve); 6. User.

DETAILED DESCRIPTION OF THE EMBODIMENTS

For further illustrating the invention, experiments detailing a seasonal heat-cold energy storage and supply pool, a seasonal energy storage system comprising the same, and usage thereof are described below. It should be noted that the following examples are intended to describe and not to limit the invention.

Figure 3:
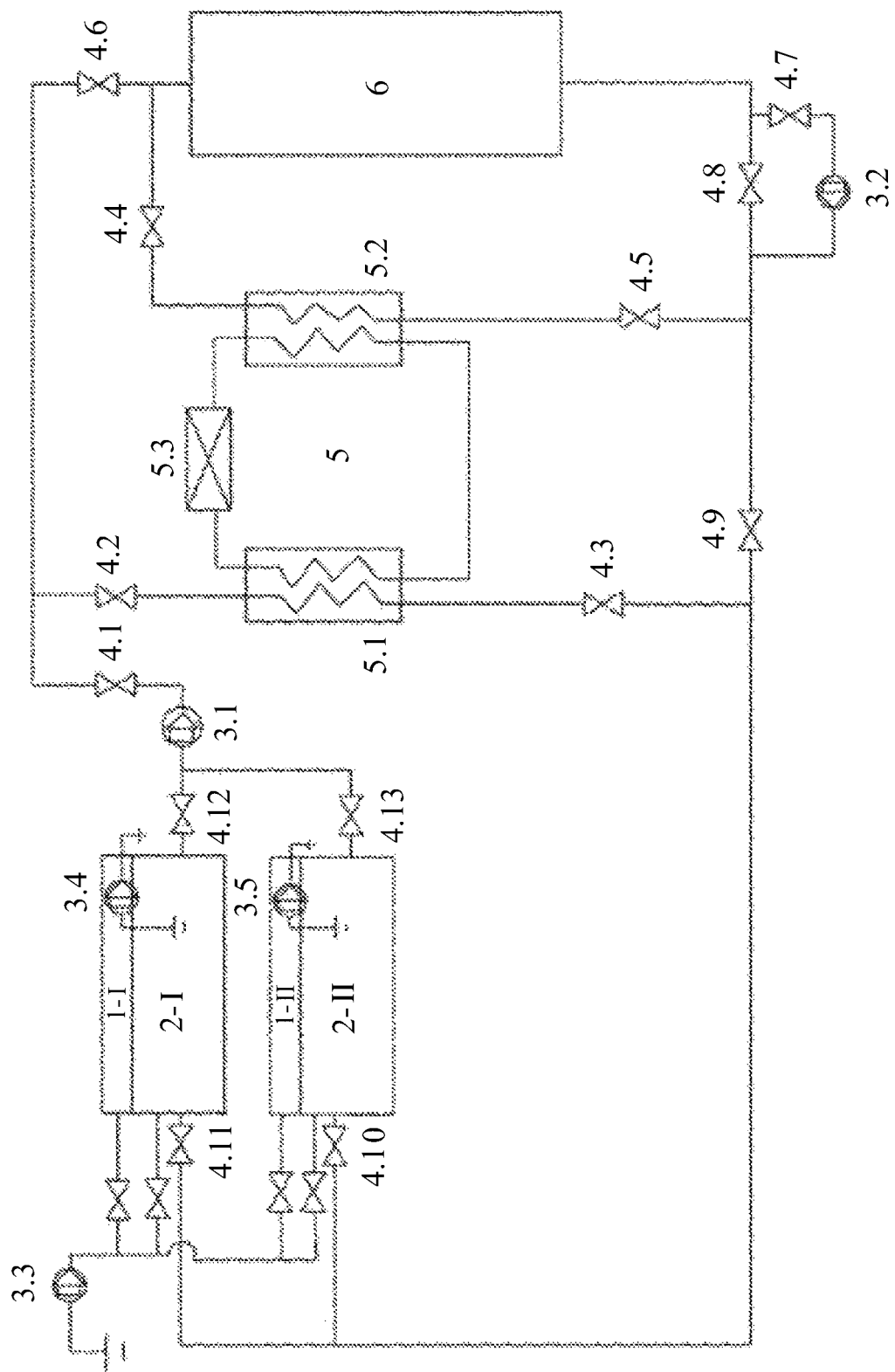
FIG. 3 is a schematic diagram of a seasonal energy storage system comprising a seasonal heat-cold energy storage and supply pool in accordance with one embodiment of the invention.

The seasonal energy storage system comprises at least two seasonal heat-cold energy storage and supply pool and a heat pump. In the example, when at least one seasonal heat-cold energy storage and supply pool was used for cooling, at least one seasonal heat-cold energy storage and supply pool was used for heating, and vice versa. As shown in FIG. 3, the seasonal heat-cold energy storage and supply pool comprises a salt-free solar pool 1 at an upper layer and an energy storage pool 2 at the lower layer. The salt-free solar pool 1 was adapted to collect heat or cold, and the energy storage pool 2 was adapted to store heat or cold. The salt-free solar pool 1 was supported by buoyant force of water in the energy storage pool 2. The salt-free solar pool 1 and the energy storage pool 2 were separately connected to a water source.

Figure 2:
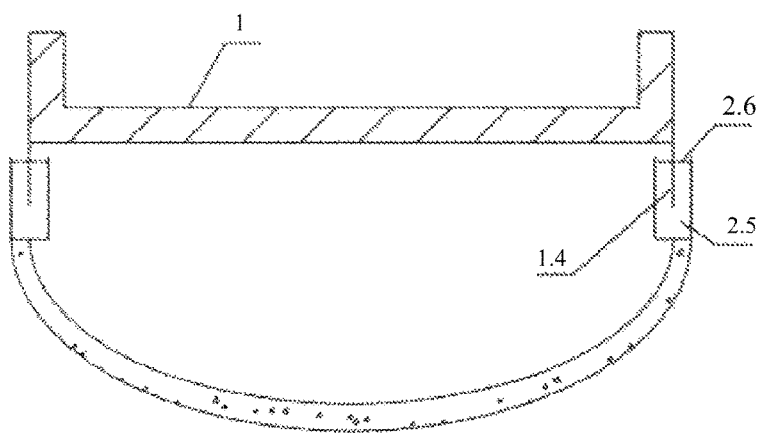
FIG. 2 is a schematic diagram showing the connection of a salt-free solar pool and an energy storage pool in accordance with one embodiment of the invention.

As shown in FIGS. 1-2, the salt-free solar pool 1 comprised a pool bottom 1.1, a pool wall 1.2, and a transparent top cover 1.3. The pool bottom 1.1 and the pool wall 1.2 were made from steel frame comprising two layers of steel plates and a polyurethane insulation coating sandwiched by the two layers of steel plates. Inner surfaces and outer surfaces of the pool bottom 1.1 and the pool wall 1.2 were coated with anti-corrosion coating, and outside of the anti-corrosion coating, the surfaces were coated with solar-energy absorbing coating as an endothermic layer, such as solar-energy absorbing coating made from silica sol. A depth of the salt-free solar pool was 500 mm, and a waterlogging depth was 300 mm. The pool top cover 1.3 was an inflated polyethylene bag, and a thin one was employed in the example so that sunlight could easily penetrate into the pool, and that heat was well-preserved. The top cover 1.3 was optional in winter. The pool bottom 1.1 of the salt-free solar pool 1 was a top cover of the energy storage pool 2. A wall and a bottom of the energy storage pool 2 were composite layers 2.1 which were composed by waterproof layer, supporting layer, and insulation layer in sequence, so that heat transfer between water and soil, heat absorption of sediments on the bottom, and heat exchange between underground aquifer and water in the energy storage pool 2 were avoided, bringing good insulation property and energy storage performance to the energy storage pool 2. The energy storage pool 2 was provided with a heat exchange coil 2.2, which connected to an external heat consuming equipment via a water supply pipe 2.4 and a water return pipe 2.3 and formed a circulation line to implement heat exchange in the energy storage pool 2 for supplying heat and cold for an external user 6. The salt-free solar pool 1 and the energy storage pool 2 were communicated through controllable valves at the pool bottom 1.1 of the salt-free solar pool 1. In addition, in the example, the salt-free solar pool 1 was supported by buoyant force of water in the energy storage pool 2, thus no extra supporting structure was needed. For the convenience of positioning and free lifting in accordance with water level in the energy storage pool 2 of the salt-free solar pool 1, a flashboard 1.4 was disposed on an edge of the pool bottom of the salt-free solar pool 1. A chute 2.5 was disposed on an edge of the wall of the energy storage pool 2. The flashboard 1.4 was adapted to slide and position in the chute 2.5, and then sealed by a sealing cap 2.6.

The example was provided with two energy storage pools 2. One was for cold storage and was named cold storage pool 2-I, and another was for heat storage and was named heat storage pool 2-II. The corresponding salt-free solar pools 1 were named salt-free solar cold-collecting pool 1-I and salt-free solar heat-collecting pool 1-II, respectively. The heat exchange coils 2.2 in the cold storage pool 2-I and the heat storage pool 2-II were connected to the user 6 via pipes, respectively. In addition, one end of the heat pump 5 was respectively connected to circulation lines in which the heat exchange coils 2.2 of the cold storage pool 2-I and the heat storage pool 2-II were located, and another end was connected to the external user 6. A plurality of water pumps 3.1-3.5 and valves 4.1-4.13 were disposed in pipelines of the system to provide power and control working conditions of the system. The heat pump 5 was adapted to be a supplement for insufficient heating and cooling of the seasonal heat-cold energy storage and supply pool, so that a too large volume of the energy storage pool 2 was avoided. An energy supply ratio between the seasonal heat-cold energy storage and supply pool and the heat pump 5 was determined by areas where the system project was located and actual situations.

A working principle of the seasonal energy storage system comprising the seasonal heat-cold energy storage and supply pool is illustrated as follows according to working conditions in summer and winter of an area:

1) Cold storage and supply: in winter, 1-3° C. lake water was pumped into the salt-free solar cold-collecting pool 1-I via the water pump 3.3 until a rated flow of the pool was reached, then the valve on the pool bottom 1.1 of the salt-free solar cold-collecting pool was opened to store the cold water into the bottom of the cold storage pool 2-I; meanwhile, the water pump 3.4 was opened to pump seasonal waste water out from the upper part of the cold storage pool 2-I to realize water exchange of the cold storage pool 2-I. The above process was repeated until the stored water in the cold storage pool 2-I was totally exchanged. In summer, the water pump 3.1 and the valves 4.1, 4.6, 4.8, 4.9, 4.11, and 4.12 were opened, and the valves 4.2, 4.3, 4.4, 4.5, 4.7, 4.10 and 4.13 were closed for cooling. Because a cold water circulation pipe of the user 6 was connected to a heat exchanger of cold storage pool 2-I, a full heat exchange between the circulation water in the heat exchange coil 2.2 of the cold storage pool 2-I and the cold water stored in the cold storage pool 2-I was implemented. The circulation water was cooled, and sent for cooling of the user 6, then the circulation water was back to the cold storage pool 2-I. The above process was repeated to guarantee the cooling of the user 6. When the water temperature in the cold storage pool 2-I was above 18° C. and could not meet the cooling requirement of the user 6, the heat pump 5 was started. At the same time, the water pump 3.1 and the valves 4.1, 4.2, 4.3, 4.11, and 4.12 were opened; the water pump 3.2 and the valves 4.4, 4.5, 4.6, and 4.7 were opened; and the valves 4.8, 4.9, 4.10, and 4.13 were closed.

2) Heat storage and supply: in summer, water was pumped into the salt-free solar heat-collecting pool 1-II via the water pump 3.3 until a rated flow of the pool was reach, and until the water was heated to above 70° C., then the valve on the pool bottom 1.1 of the salt-free solar heat-collecting pool was opened to store the hot water into the heat storage pool 2-II; meanwhile, the water pump 3.5 was opened to pump seasonal waste water out from the upper part of the heat storage pool 2-II to realize water exchange of the heat storage pool 2-II. The above process was repeated until the stored water in the heat storage pool 2-II was totally exchanged. In winter, the water pump 3.1 and the valves 4.1, 4.6, 4.8, 4.9, 4.10, and 4.13 were opened, and the valves 4.2, 4.3, 4.4, 4.5, 4.7, 4.11 and 4.12 were closed for heating. Because a hot water circulation pipe of the user 6 was connected to the heat exchanger of heat storage pool 2-II, a full heat exchange between the circulation water in the heat exchange coil 2.2 of the heat storage pool 2-II and the hot water stored in the heat storage pool 2-II was implemented. The circulation water was heated, and sent for heating of the user 6, then the circulation water was back to the heat storage pool 2-II. The above process was repeated to guarantee the heating of the user 6. When the water temperature in the heat storage pool 2-II was below 40° C. and could not meet the heating requirement of the user 6, the heat pump 5 was started. At the same time, the water pump 3.1 and the valves 4.1, 4.2, 4.3, 4.4, 4.5, 4.10, and 4.13 were opened; the water pump 3.2 and the valve 4.7 were opened; and the valves 4.6, 4.8, 4.9, 4.11, and 4.12 were closed;

When the number of the seasonal heat-cold energy storage and supply pool is more than 2, the connections and the working principles are the same as above.

The seasonal heat-cold energy storage and supply pool features a novel and simple structure, making the most of natural energy sources such as water in the lakes and rivers of areas which are hot in summer and cold in winter, so as to realize seasonal energy storage, and heating and cooling, thus energy is saved and environment is protected. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention. For example, other regular insulation material can be used as a substitute for the polyurethane insulation coating sandwiched by the two layers of steel plates which feature high intensity and good thermal insulation property; other transparent insulation structures can be used as a substitute for the inflated polyethylene bag in the example, and the top cover 1.3 is optional according to the local climate; and the composite layer 2.1 is designed to be similar to a simple reservoir, which facilitates the construction.

The invention claimed is:

1. A seasonal heat-cold energy storage and supply pool, comprising a salt-free solar pool at an upper layer and an energy storage pool at a lower layer; wherein:
   the salt-free solar pool and the energy storage pool are separately connected to a water source;
   the salt-free solar pool comprises a pool bottom and a pool wall;
   the pool bottom of the salt-free solar pool functions as a top cover of the energy storage pool;
   the energy storage pool comprises a wall and a bottom which are a composite layer;
   the energy storage pool is provided with a heat exchange coil configured to implement heat exchange in the energy storage pool for supplying heat and cold for an external user;
   the salt-free solar pool and the energy storage pool are communicated through controllable valves at the pool bottom of the salt-free solar pool;
   a flashboard is disposed on an edge of the pool bottom of the salt-free solar pool; a chute is disposed on an edge of the wall of the energy storage pool;
   the flashboard is adapted to slide and position in the chute, and then is sealed by a sealing cap; and
   the salt-free solar pool was supported by buoyant force of water in the energy storage pool.

2. The pool of claim 1, wherein a depth of the salt-free solar pool is between 300 mm and 500 mm, and a water-logging depth of the salt-free solar pool is between 200 mm and 400 mm.

3. The pool of claim 2, wherein the composite layer of the energy storage layer comprises a waterproof layer, a supporting layer, and an insulation layer in sequence.

4. The pool of claim 1, wherein the composite layer of the energy storage layer comprises a waterproof layer, a supporting layer, and an insulation layer in sequence.

5. The pool of claim 1, wherein outer surfaces of the pool bottom and the pool wall are coated with a solar-energy absorbing coating.

6. A seasonal heat-cold energy storage and supply system, comprising the seasonal heat-cold energy storage and supply pool of claim 1 and a heat pump, wherein the system comprises at least two seasonal heat-cold energy storage and supply pools; at least one seasonal heat-cold energy storage and supply pool is used for cold storage and supply, and at least one seasonal heat-cold energy storage and supply pool is used for heat storage and supply; one end of the heat pump is connected to a circulation line of the heat exchange coil of each energy storage pool, and another end thereof is connected to the external user; a plurality of water pumps and controllable valves are disposed in pipelines of the system to provide power and control working conditions of the system.

7. A seasonal heat-cold energy storage and supply pool, comprising a salt-free solar pool at an upper layer and an energy storage pool at a lower layer; wherein:
   the salt-free solar pool and the energy storage pool are separately connected to a water source;
   the salt-free solar pool comprises a pool bottom and a pool wall;

the pool bottom of the salt-free solar pool functions as a top cover of the energy storage pool;

the energy storage pool comprises a wall and a bottom which are a composite layer;

the energy storage pool is provided with a heat exchange coil configured to implement heat exchange in the energy storage pool for supplying heat and cold for an external user;

the salt-free solar pool and the energy storage pool are communicated through controllable valves at the pool bottom of the salt-free solar pool;

the pool bottom and the pool wall are made from steel frame comprising two layers of steel plates and a polyurethane insulation coating sandwiched by the two layers of steel plates;

a flashboard is disposed on an edge of the pool bottom of the salt-free solar pool;

a chute is disposed on an edge of the wall of the energy storage pool;

the flashboard is adapted to slide and position in the chute, and then is sealed by a sealing cap; and the salt-free solar pool was supported by buoyant force of water in the energy storage pool.

8. The pool of claim 7, wherein outer surfaces of the pool bottom and the pool wall are coated with a solar-energy absorbing coating.

9. The pool of claim 7, wherein the composite layer of the energy storage layer comprises a waterproof layer, a supporting layer, and an insulation layer in sequence.

10. The pool of claim 7, wherein a depth of the salt-free solar pool is between 300 mm and 500 mm, and a waterlogging depth of the salt-free solar pool is between 200 mm and 400 mm.

11. The pool of claim 10, wherein the composite layer of the energy storage layer comprises a waterproof layer, a supporting layer, and an insulation layer in sequence.

12. The pool of claim 7, wherein the salt-free solar pool is provided with a transparent top cover.

13. The pool of claim 12, wherein the composite layer of the energy storage layer comprises a waterproof layer, a supporting layer, and an insulation layer in sequence.

14. The pool of claim 12, wherein a depth of the salt-free solar pool is between 300 mm and 500 mm, and a waterlogging depth of the salt-free solar pool is between 200 mm and 400 mm.

15. The pool of claim 14, wherein the composite layer of the energy storage layer comprises a waterproof layer, a supporting layer, and an insulation layer in sequence.

16. The pool of claim 12, wherein the top cover is an inflated polyethylene bag.

17. The pool of claim 16, wherein a depth of the salt-free solar pool is between 300 mm and 500 mm, and a waterlogging depth of the salt-free solar pool is between 200 mm and 400 mm.

18. The pool of claim 16, wherein the composite layer of the energy storage layer comprises a waterproof layer, a supporting layer, and an insulation layer in sequence.

* * * * *